United States Patent
Lee et al.

(10) Patent No.: US 12,388,139 B2
(45) Date of Patent: Aug. 12, 2025

(54) BATTERY MODULE AND BATTERY PACK INCLUDING THE SAME

(71) Applicant: LG Energy Solution, Ltd., Seoul (KR)

(72) Inventors: Youngho Lee, Daejeon (KR); Soo Youl Kim, Daejeon (KR); Seung Ryul Baek, Daejeon (KR); Han Ki Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 814 days.

(21) Appl. No.: 17/430,224

(22) PCT Filed: Jul. 6, 2020

(86) PCT No.: PCT/KR2020/008790
§ 371 (c)(1),
(2) Date: Aug. 11, 2021

(87) PCT Pub. No.: WO2021/107312
PCT Pub. Date: Jun. 3, 2021

(65) Prior Publication Data
US 2022/0166100 A1 May 26, 2022

(30) Foreign Application Priority Data
Nov. 25, 2019 (KR) .................. 10-2019-0152654

(51) Int. Cl.
*H01M 10/65* (2014.01)
*H01M 10/653* (2014.01)
(Continued)

(52) U.S. Cl.
CPC ....... *H01M 50/211* (2021.01); *H01M 10/653* (2015.04); *H01M 10/655* (2015.04);
(Continued)

(58) Field of Classification Search
CPC ............. H01M 50/211; H01M 50/207; H01M 50/505; H01M 50/233
See application file for complete search history.

(56) References Cited

U.S. PATENT DOCUMENTS

| | | |
|---|---|---|
| 2012/0225339 A1 | 9/2012 | Nakaguchi et al. |
| 2015/0099146 A1 | 4/2015 | Kim et al. |
| | (Continued) | |

FOREIGN PATENT DOCUMENTS

| | | | | |
|---|---|---|---|---|
| CN | 110505325 A | * | 11/2019 | ............ B32B 9/005 |
| KR | 20130126159 A | | 11/2013 | |
| | (Continued) | | | |

OTHER PUBLICATIONS

International Search Report for Application No. PCT/KR2020/008790 mailed Oct. 29, 2020, pp. 1-3.

*Primary Examiner* — Nicholas A Smith
*Assistant Examiner* — Ziheng Lu
(74) *Attorney, Agent, or Firm* — Lerner David LLP (57) ABSTRACT

A battery module according to an embodiment of the present disclosure includes: a battery cell stack in which a plurality of battery cells are stacked; a module frame accommodating the battery cell stack and having an open upper part; and an upper plate covering the battery cell stack over the open upper part of the module frame. The module frame includes a bottom part and two side parts opposite to each other. The bottom part of the module frame includes a first region and a second region, the first region being located along an edge of the bottom part extending along at least one of the side parts of the module frame, and the second region being located inside the first region. The thickness of the bottom part of the module frame is smaller in the second region than in the first region.

12 Claims, 8 Drawing Sheets

(51) Int. Cl.
  *H01M 10/655*    (2014.01)
  *H01M 50/207*    (2021.01)
  *H01M 50/211*    (2021.01)
  *H01M 50/505*    (2021.01)

(52) U.S. Cl.
  CPC ....... *H01M 50/207* (2021.01); *H01M 50/505* (2021.01); *H01M 2220/20* (2013.01)

(56) References Cited

U.S. PATENT DOCUMENTS

| | | | |
|---|---|---|---|
| 2016/0093862 A1* | 3/2016 | DeKeuster | H01M 50/209 |
| | | | 429/121 |
| 2017/0025719 A1 | 1/2017 | Yamada et al. | |
| 2017/0069887 A1 | 3/2017 | Lee et al. | |
| 2018/0138565 A1* | 5/2018 | Lee | H01M 10/6554 |
| 2019/0131596 A1* | 5/2019 | Yang | H01M 50/224 |
| 2019/0173065 A1* | 6/2019 | Millon | H01M 50/278 |
| 2019/0198952 A1* | 6/2019 | Choi | H01M 50/20 |
| 2019/0280265 A1 | 9/2019 | Jansen et al. | |
| 2019/0305261 A1* | 10/2019 | Kim | H01M 10/6554 |
| 2020/0168864 A1 | 5/2020 | Seo et al. | |

FOREIGN PATENT DOCUMENTS

| | | |
|---|---|---|
| KR | 20170030667 A | 3/2017 |
| KR | 101792751 B1 | 10/2017 |
| KR | 20190078521 A | 7/2019 |
| KR | 20190078841 A | 7/2019 |
| WO | 2011114625 A1 | 9/2011 |
| WO | 2015151884 A1 | 10/2015 |
| WO | 2018022907 A1 | 2/2018 |
| WO | 2019088625 A1 | 5/2019 |

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008790 filed Jul. 6, 2020, which claims priority from Korean Patent Application No. 10-2019-0152654 filed on Nov. 25, 2019, the disclosure of which is incorporated herein by reference in its entirety.

TECHNICAL FIELD

The present disclosure relates to a battery module and a battery pack including the same, and more particularly, to a battery module that improves space utilization rate and minimizes the amount of thermally conductive resin used, and a battery pack including the same.

BACKGROUND ART

Secondary batteries, which are easily applied to various product groups and have electrical characteristics such as high energy density, are universally applied not only for a portable device but also for an electric vehicle or a hybrid electric vehicle, an energy storage system or the like, which is driven by an electric driving source. Such secondary batteries are attracting attention as a new environmentally-friendly energy source for improving energy efficiency since they provide a primary advantage of remarkably reducing the use of fossil fuels and also do not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

Figure 1:
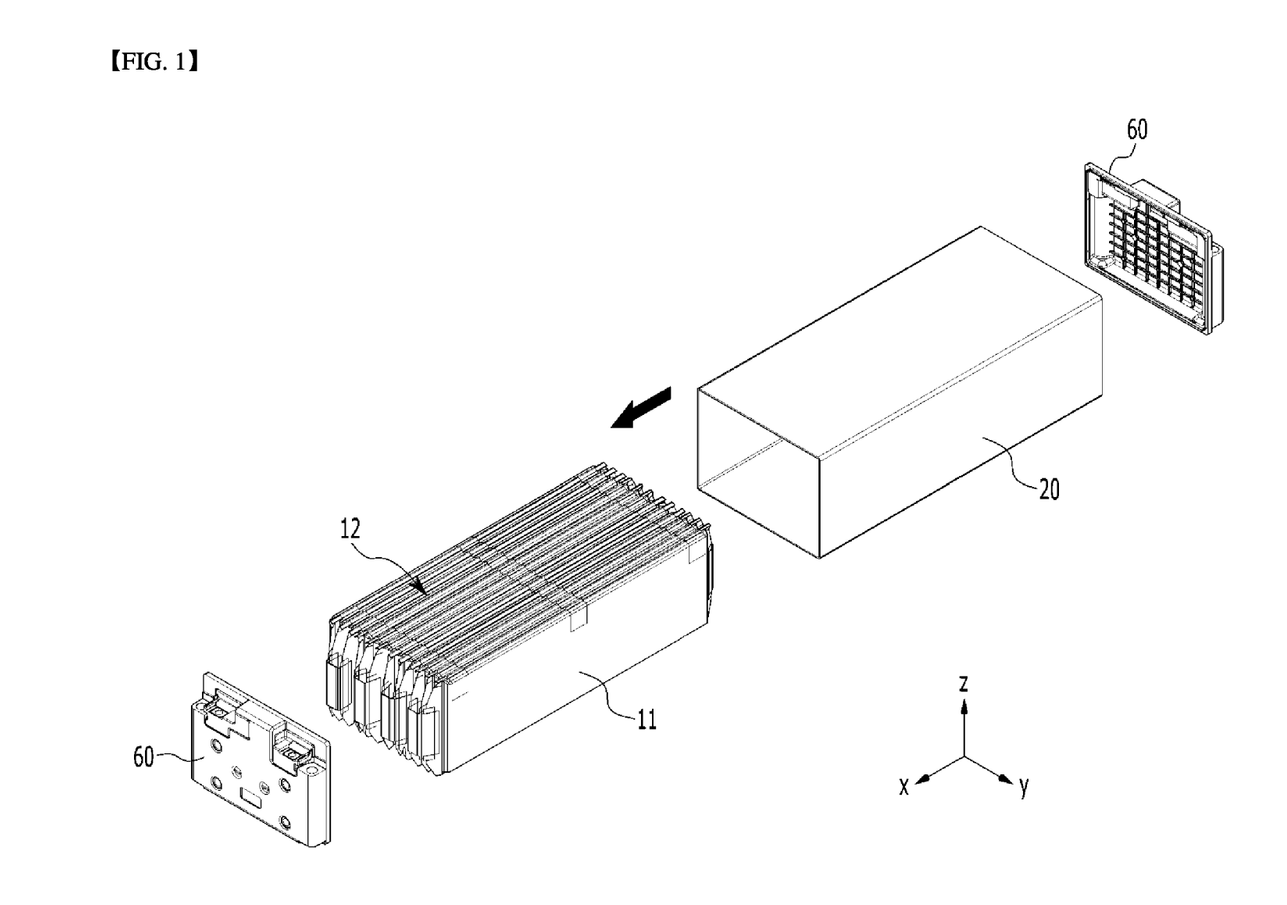
FIG. 1 is an exploded perspective view illustrating a battery module having a mono frame according to the related art.

FIG. 1 is a perspective view illustrating a battery module having a mono frame according to the related art.

Referring to FIG. 1, the battery module may include a battery cell stack 12 formed by stacking a plurality of battery cells 11, a mono frame 20 whose front and rear surfaces are opened to cover the battery cell stack 12, and end plates 60 covering the front and rear surfaces of the mono frame 20. In order to form such a battery module, it is necessary to horizontally assemble the components such that the battery cell stack 12 is inserted into the opened front or rear surfaces of the mono frame 20 along the X-axis direction as shown by the arrow in FIG. 1. However, in order to stabilize such a horizontal assembly, sufficient clearance must be secured between the battery cell stack 12 and the mono frame 20. Herein, the clearance refers to a gap generated by press-fitting or the like.

A thermally conductive resin layer (not illustrated) may be formed between the battery cell stack 12 and the mono frame 20. The thermally conductive resin layer may serve to transfer heat generated from the battery cell stack to the outside of the battery module, and fix the battery cell stack in the battery module. When a tolerance increases, the amount of the thermally conductive resin layer used may increase more than necessary.

In addition, the height of the mono frame 20 should be designed to be large in consideration of the maximum height of the battery cell stack 12, the assembling tolerance in the insertion process, and the like, and accordingly, an unnecessarily wasted space may occur.

DETAILED DESCRIPTION OF THE INVENTION

Technical Problem

It is an object of the present disclosure to provide a battery module that improves space utilization rate and minimizes the amount of thermally conductive resin used, by modifying a structure of a frame member surrounding a battery cell stack, and a battery pack including the same.

However, the problem to be solved by the embodiments of the present disclosure is not limited to the above-described problems, and can be variously expanded within the scope of the technical idea included in the present disclosure.

Technical Solution

A battery module according to an embodiment of the present disclosure includes: a battery cell stack in which a plurality of battery cells are stacked; a module frame accommodating the battery cell stack and having opened upper part; and an upper plate covering the battery cell stack on the opened upper part of the module frame, wherein the module frame includes a bottom part and two side surface parts opposite to each other, the bottom part includes a first portion and a second portion, the first portion is located at an edge based on the thickness direction of the battery cell, the second portion is located inside the first portion, and the thickness of the second portion located along the thickness direction of the battery cell is smaller than the thickness of the first portion.

The battery module may further include a pad part located between the bottom part and the battery cell stack, in which the pad part may be in close contact with a connecting part between the side surface part and the first portion of the bottom part.

The second portion of the bottom part may be located further outside the first portion in the longitudinal direction of the battery cell stack, and the thickness of the second portion located along the longitudinal direction of the battery cell stack may be smaller than the thickness of the first portion.

The battery module may further include a bus bar frame connected to the battery cell stack, in which the module frame may be opened at both sides opposite to each other based on a direction in which an electrode lead of the battery cell stack protrudes, and the bus bar frame is connected to the battery cell stack on both the opened sides of the module frame, the bus bar frame may include a main frame disposed perpendicular to the direction in which the electrode lead protrudes, and a bent part extending from a lower portion of the main frame, and the bent part is located above the second portion of the bottom part.

The total thickness of the thickness of the bent part and the thickness of the second portion may be smaller than the thickness of the first portion.

The battery cell may include a protrusion part formed in the width direction, and the protrusion part may be located on the bent part.

The pad part may be located between the first portion and the battery cell stack.

The battery module may further include a thermally conductive resin layer located between the first portion and the batter cell stack, in which the pad part is located between the thermally conductive resin layer and the second portion.

The battery module may further include end plates coupled to both of the opened sides of the module frame, respectively, in which both of the opened sides of the module frame may be opposite to each other based on a direction in which an electrode lead of the battery cell stack protrudes.

A battery pack according to another embodiment of the present disclosure includes the above-described battery module.

Advantageous Effects

According to the embodiments, by implementing the U-shaped frame, a clearance between a battery cell stack and the frame can be reduced compared to the related art, thereby improving a space utilization rate.

Further, by utilizing an overflow prevention structure, a thermally conductive resin can be prevented from flowing to an unintended space when the battery cell stack is inserted.

Further, by forming the overflow prevention structure on the module frame, the formability of the bus bar frame itself can be increased, as compared to a case where the overflow prevention structure is formed in the bus bar frame according to the related art.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, the size and thickness of each element shown in the figures are arbitrarily illustrated for convenience of description, and the present disclosure is not necessarily limited to those illustrated in the drawings. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 2:
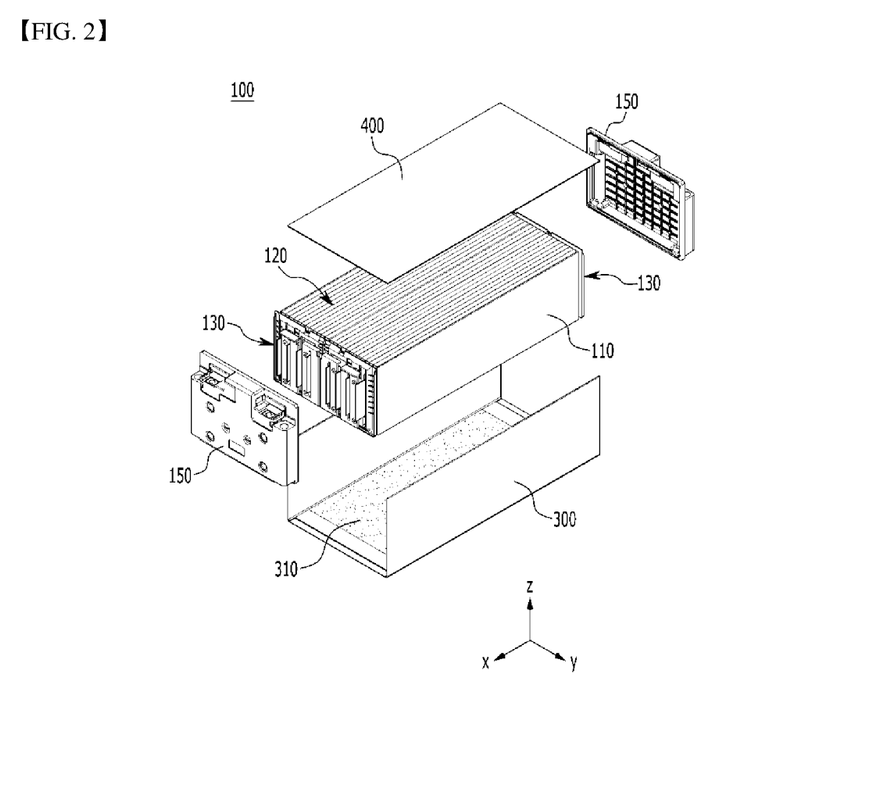
FIG. 2 is an exploded perspective view illustrating a battery module according to an embodiment of the present disclosure.
Figure 3:
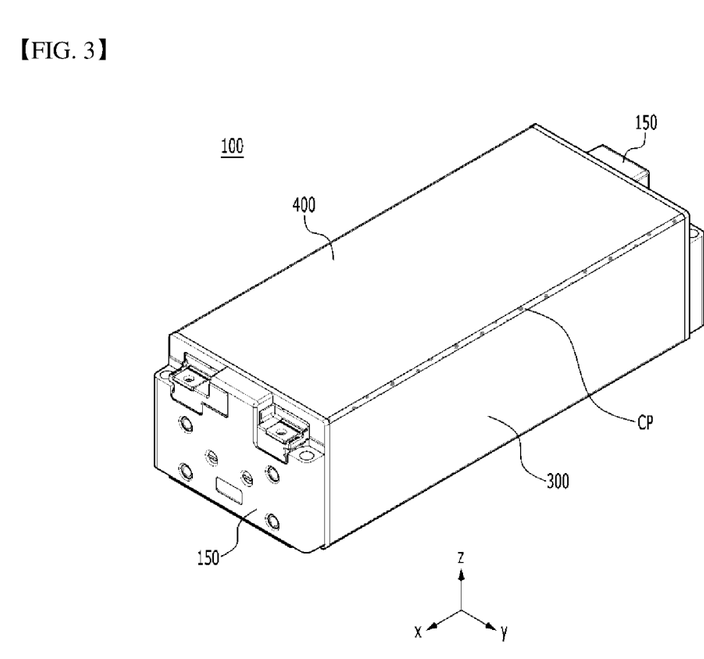
FIG. 3 is a perspective view illustrating a state in which components of the battery module of FIG. 2 are coupled to each other.
Figure 4:
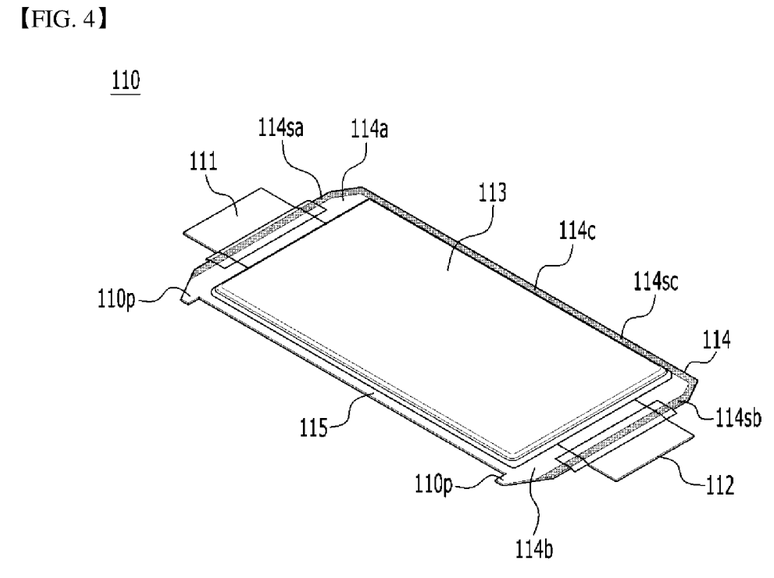
FIG. 4 is a perspective view illustrating one battery cell included in a battery cell stack of FIG. 2.

FIG. 2 is an exploded perspective view illustrating a battery module according to an embodiment of the present disclosure. FIG. 3 is a perspective view illustrating a state in which components of the battery module of FIG. 2 are coupled to each other. FIG. 4 is a perspective view illustrating one battery cell included in a battery cell stack of FIG. 2.

Referring to FIGS. 2 and 3, a battery module 100 according to the present embodiment includes: a battery cell stack 120 including a plurality of battery cells 110; a U-shaped frame 300 (i.e., module frame) of which the upper surface, the front surface, and the rear surface are opened; an upper plate 400 that covers an upper portion of the battery cell stack 120; end plates 150 that are located on the front surface and the rear surface of the battery cell stack 120, respectively; and bus bar frames 130 that are located between the battery cell stack 120 and the end plates 150. Further, the battery module 100 includes a thermally conductive resin layer 310 located between the U-shaped frame 300 and the battery cell stack 120. The thermally conductive resin layer 310, which is a type of heat dissipation layer, may be formed by applying a material having a heat dissipation function.

When opened both sides of the U-shaped frame 300 are referred to as a first side and a second side, respectively, the U-shaped frame 300 has a plate-shaped structure that is bent to continuously surround the front surface, the lower surface, and the rear surface adjacent to each other among the other outer surfaces except surfaces of the battery cell stack 120 corresponding to the first side and the second side. The upper surface corresponding and opposite to the lower surface of the U-shaped frame 300 is opened.

The upper plate 400 has one plate-shaped structure surrounding the upper surface of the remainder excluding the front, lower and rear surfaces which are surrounded by the U-shaped frame 300. The U-shaped frame 300 and the upper plate 400 may be coupled by welding or the like in a state in which the corresponding corner areas are in contact with each other, thereby forming a structure surrounding the battery cell stack 120. That is, the U-shaped frame 300 and the upper plate 400 may have a coupling portion CP formed along edges corresponding to each other by a coupling method such as welding.

The battery cell stack 120 may include a plurality of battery cells 110 stacked in one direction, and the plurality of battery cells 110 may be stacked in a Y-axis direction, as illustrated in FIG. 2. In other words, a direction in which the plurality of battery cells 110 are stacked may be identical to a direction in which two side surface parts of the U-shaped frame 300 are opposite to each other.

It is preferable that the battery cell 110 is a pouch-type battery cell. For example, referring to FIG. 4, the battery cell 110 according to the present embodiment has a structure in which two electrode leads 111 and 112 are opposite to each other, and respectively protrude from one end 114a and the other end 114b of a battery body 113. The battery cell 110 may be manufactured by bonding both ends 114a and 114b of a case 114 and both side surfaces 114c connecting them in a state in which an electrode assembly (not illustrated) is accommodated in the battery case 114. In other words, the battery cell 110 according to the present embodiment has a total of three sealing parts 114sa, 114sb, and 114sc, the sealing parts 114sa, 114sb, and 114sc have a structure in which the sealing parts 114sa, 114sb, and 114sc are sealed by a method such as thermal fusion, and the other side surface part may be formed by a connecting portion 115. A direction between the both ends 114a and 114b of the battery case 114 may be defined as a longitudinal direction of the battery cell 110, and a direction between the connecting portion 115 and the side surface part 114c connecting the both ends 114a and 114b of the battery case 114 may be defined as a width direction of the battery cell 110.

The connecting portion 115 may be an area extending longitudinally along one edge of the battery cell 110, and a protrusion part 110p of the battery cell 110 may be formed at an end part of the connecting portion 115. The protrusion part 110p may be formed at at least one of both ends of the connecting portion 115, and may protrude in a direction perpendicular to a direction in which the connecting portion 115 extends. The protrusion part 110p may be located between the connecting portion 115 and one of the sealing parts 114sa and 114sb of each end 114a and 114b of the battery case 114.

The battery case 114 generally has a laminate structure of a resin layer/metal thin film layer/resin layer. For example, in the case where the surface of the battery case is made of O (oriented)-nylon layer, if the surfaces of battery cells are stacked to form a medium-sized or large-sized battery module, the battery cells tend to easily slide due to external impact. Thus, in order to prevent the sliding and maintain a stable stack structure of the battery cells, the battery cell stack 120 may be formed by attaching, to the surface of the battery case, an adhesive member such as an adhesion adhesive such as a double-sided tape and a chemical adhesive providing bonding by a chemical reaction during adhesion. In the present embodiment, the battery cell stack 120 may be stacked in the Y-axis direction, may be accommodated inside the U-shaped frame 300 in the Z-axis direction, and may be cooled by a thermally conductive resin layer, which will be described below. As a comparative example, there is a case in which the battery cells are formed as cartridge-type components, and fixing between the battery cells may thus be made by assembling a battery module frame. In such a comparative example, due to the presence of the cartridge-type components, there may be little cooling action or the cooling action may be progressed in the plane direction of the battery cells, the cooling action hardly proceeds or may proceed in a surface direction of the battery cell, and cooling is not well performed in a height direction of the battery module.

Figure 5:
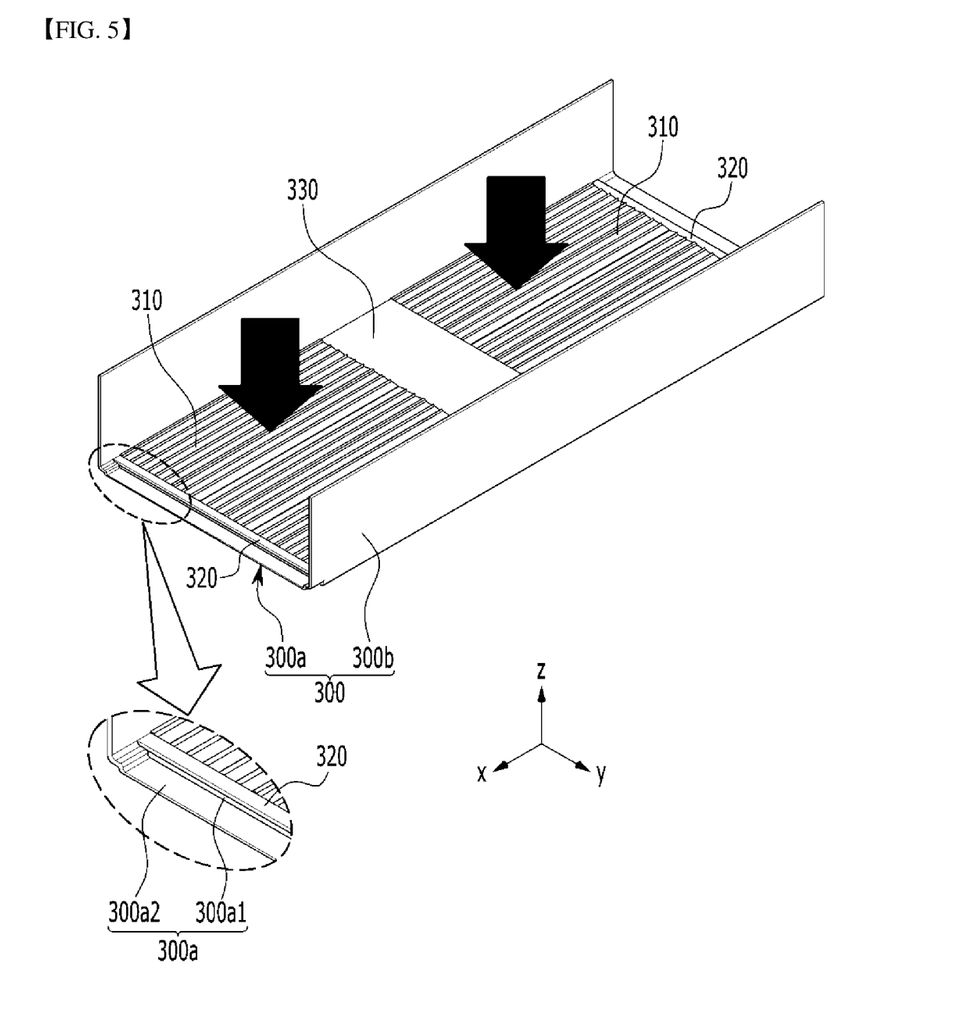
FIG. 5 is a perspective view illustrating a U-shaped frame in the battery module of FIG. 2.

FIG. 5 is a perspective view illustrating a U-shaped frame in the battery module of FIG. 2.

Referring to FIG. 5, the U-shaped frame 300 according to the present embodiment includes a bottom part 300a and two side surface parts 300b opposite to each other. Before the battery cell stack 120 described in FIG. 2 is mounted on the bottom part 300a of the U-shaped frame 300, a thermally conductive resin is applied to the bottom part 300a of the U-shaped frame 300, and the thermally conductive resin is cured, thereby forming the thermally conductive resin layer 310.

Before the thermally conductive resin layer 310 is formed, that is, before the applied thermally conductive resin is cured, the battery cell stack 120 may be mounted on the bottom part 300a of the U-shaped frame 300 while moving along a direction perpendicular to the bottom part 300a of the U-shaped frame 300. Thereafter, the thermally conductive resin layer 310 formed by curing the thermally conductive resin is located between the bottom part 300a of the U-shaped frame 300 and the battery cell stack 120. The thermally conductive resin layer 310 may serve to transfer heat generated by the battery cells 110 to the bottom of the battery module 100, and fix the battery cell stack 120.

The battery module according to the present embodiment may further include a pad part 320 formed on the bottom part 300a of the U-shaped frame 300. The pad part 320 may guide the application position of the thermally conductive resin or prevent the thermally conductive resin from overflowing to the outside of the bottom part 300a, and at least one pad part 320 may be formed. Further, when there is no pad part 320 according to the present embodiment, if the thermally conductive resin excessively overflows, is thus formed in an unnecessary part, and is then cured, an unintended failure mode may also be formed. Although it is illustrated in FIG. 5 that one pad part 320 is formed at each of both ends of the bottom part 300a based on the X-axis direction, the size, the position, and the number of the pad part 320 may be modified and designed in consideration of the amount of the thermally conductive resin applied. The pad part 320 may be formed of an insulation film. At this time, the pad part 320 may be formed of a material such as polyurethane (PU) foam or rubber such that the thermally conductive resin may be compressed by bringing the battery cells 110 into contact with an upper portion of the bottom part 300a.

According to the present embodiment, the thermally conductive resin layer 310 includes a plurality of application lines extending longitudinally along a direction perpendicular to the direction in which the plurality of battery cells 110 are stacked. The plurality of application lines may form two groups, and an insulation film 330 may be formed between the two groups. The insulation film 330 may function to maintain the insulation performance between the battery cells 110 and the U-shaped frame 300, and the thermally conductive resin may be at least partially applied onto the insulation film 330.

Referring back to FIGS. 2 and 3, the width of the side surface parts 300b of the U-shaped frame 300 according to the present embodiment may be identical to that of the upper plate 400. In other words, edge portions of the upper plate 400 along the X-axis direction and edge portions of the side surface parts 300b of the U-shaped frame 300 along the X-axis direction may be in direct contact with each other and coupled to each other through a method such as welding.

Figure 6:
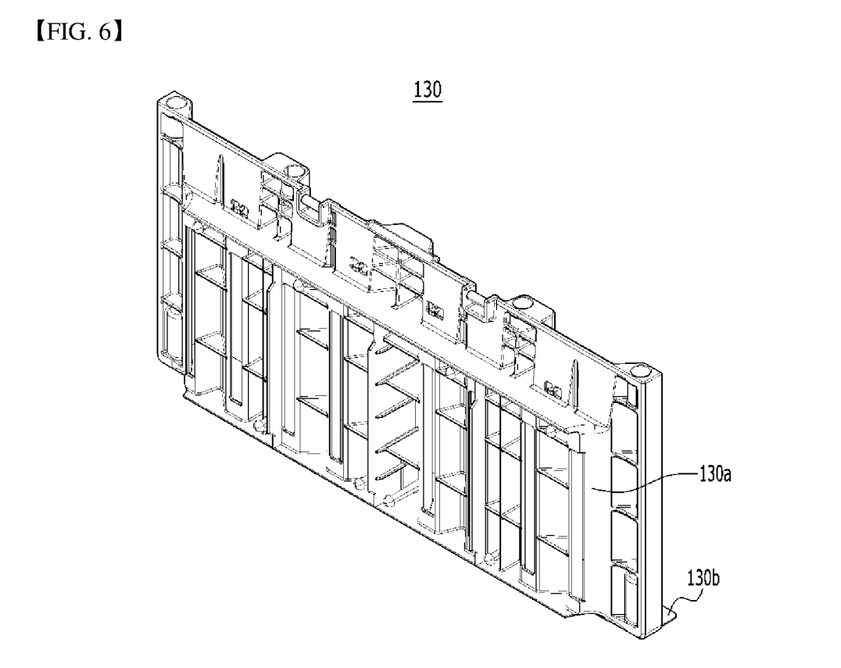
FIG. 6 is a perspective view illustrating a bus bar frame in the battery module of FIG. 2.

FIG. 6 is a perspective view illustrating a bus bar frame in the battery module of FIG. 2.

Referring to FIG. 6, the bus bar frame 130 according to the present embodiment includes a main frame 130a disposed perpendicular to the direction in which the electrode leads 111 and 112 described in FIG. 4 protrude and a bent part 130b extending from a lower portion of the main frame 130a. As illustrated in FIGS. 2 and 3, the bus bar frame 130 is connected to the battery cell stack 120. A structure in which the electrode leads pass through slits and are coupled to bus bars may be formed in the main frame 130a. The bent part 130b may be bent so as to be oriented about 90 degrees relative to the main frame 130a and may be located on the bottom part 300a of the U-shaped frame 300. The bent part 130b and peripheral configurations will be additionally described with reference to FIGS. 7 and 9.

Figure 7:
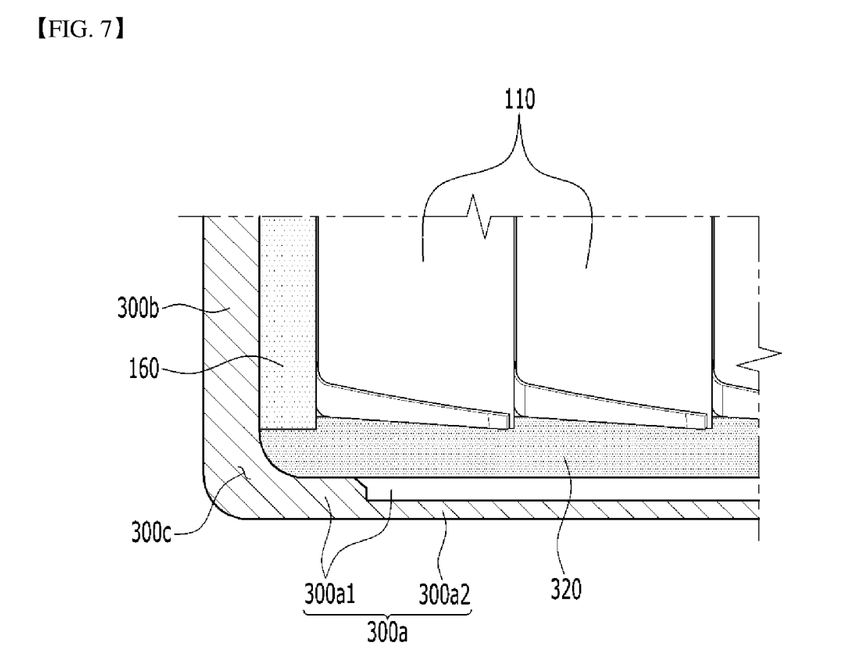
FIG. 7 is a cross-sectional view taken along the YZ plane, which is the width direction of the battery cell stack in FIG. 3.
Figure 8:
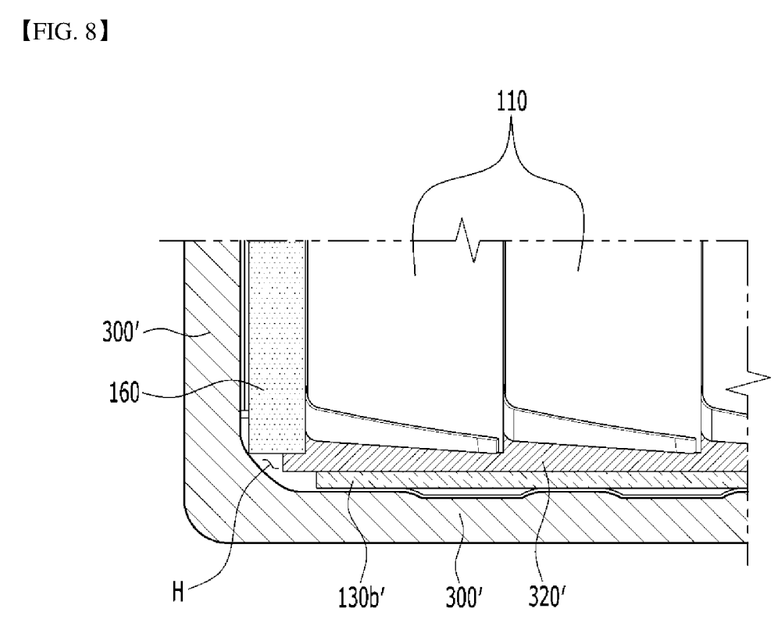
FIG. 8 is a cross-sectional view of a battery module corresponding to a comparative example to FIG. 7.

FIG. 7 is a cross-sectional view taken along the YZ plane, which is in the width direction of the battery cell stack in FIG. 3. FIG. 8 is a sectional view of a battery module corresponding to a comparative example to FIG. 7.

Referring to FIGS. 5 and 7, the bottom part 300a of the U-shaped frame 300 according to the present embodiment includes a first portion 300a1 and a second portion 300a2, the first portion 300a1 is located along an edge of the bottom part 300a in the thickness direction of the battery cells 110, and the second portion 300a2 is located inside the first portion 300a1. The thickness direction of the battery cells 110 is identical to the Y-axis direction illustrated in FIG. 2. At this time, the thickness of the second portion 300a2 is smaller than the thickness of the first portion 300a1. By differently forming the thickness of the U-shaped frame 300 at different portions of the bottom part 300a in the Y-axis direction, the size of the battery module 100 according to the present embodiment may be reduced simultaneously while the rigidity of a portion where the bottom part 300a and the side surface parts 300b are connected to each other is improved, so that the energy density may be increased.

The U-shaped frame 300 according to the present embodiment includes a connecting part 300c where the side surface part 300b and the first portion 300a1 of the bottom part 300a are in contact with each other. The pad part 320 located between the bottom part 300a and the battery cell stack 120 may be in close contact with the connecting part 300c. In this way, the possibility that the thermally conductive resin forming the thermally conductive resin layer 310 described in FIG. 5 is diffused to a portion other than the application portion despite the fact that the pad part 320 is formed can be prevented due to the structure in which the pad part 320 and the U-shaped frame 300 are in close contact with each other.

The battery module according to the present embodiment may further include a compression pad 160 located between the outermost battery cell 110 and the side surface part 300b of the U-shaped frame 300. The compression pad 160 may be formed of a polyurethane-based material. The compression pad 160 may absorb a change in the thickness due to swelling of the battery cell 110 and a change of the battery cell 110 due to external impact. At least one compression pad 160 may be formed also between the adjacent battery cells 110 as well as between the outermost battery cell 110 and the side surface part of the U-shaped frame 300.

Referring to FIG. 8, unlike the embodiment of FIG. 7, a pad part 320' is formed on a bent part 130b' of the bus bar frame 130. In such a structure, since the pad part 320' is difficult to position in close contact with a module frame 300', and a hole H is formed between the bent part 130b', the module frame 300', and the pad part 320', the thermally conductive resin may overflow.

Figure 9:
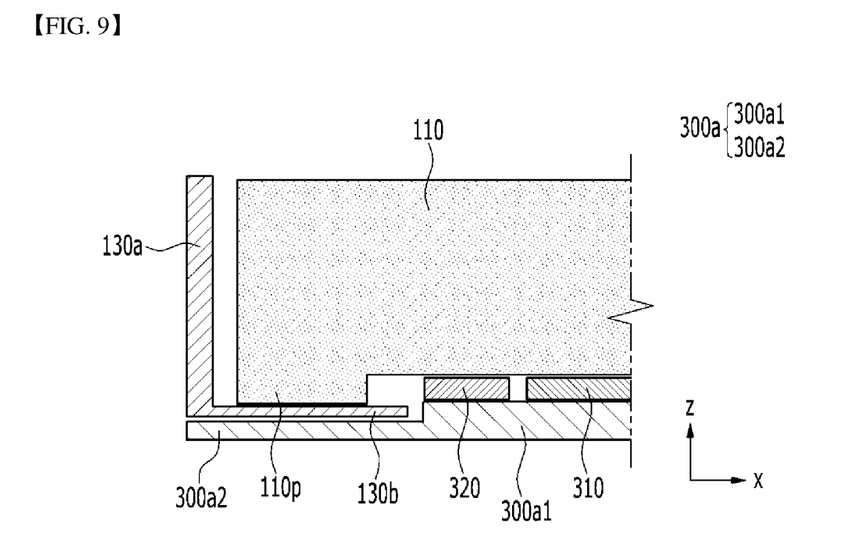
FIG. 9 is a sectional view taken along the XZ plane, which is the longitudinal direction of the battery cell stack in FIG. 3.
Figure 10:
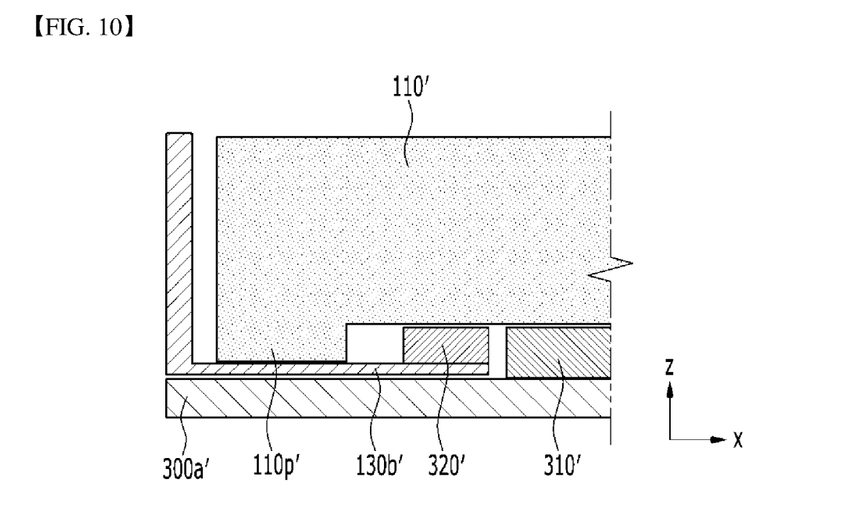
FIG. 10 is a sectional view of a battery module corresponding to a comparative example to FIG. 9.

FIG. 9 is a sectional view taken along the XZ plane, which is in the longitudinal direction of the battery cell stack in FIG. 3. FIG. 10 is a sectional view of a battery module corresponding to a comparative example to FIG. 9.

Referring to FIG. 9, the battery cell 110 according to the present embodiment includes a protrusion part 110p formed in the width direction, and the protrusion part 110p is located on the bent part 130b. Here, the width direction of the battery cell 110 may be a Z-axis direction of FIG. 9. The bottom part 300a of the U-shaped frame according to the present embodiment further includes a second portion 300a2 located on the outer side of the first portion 300a1 in the longitudinal direction of the battery cell stack 120. In other words, the second portion 300a2 is located along an edge of the bottom part 300a in the longitudinal direction of the battery cell 110, and the first portion 300a1 is located inside the second portion 300a2. At this time, it is preferable that the thickness of the second portion 300a2 is smaller than the thickness of the first portion 300a1. Here, the longitudinal direction of the battery cell 110 may be the X-axis direction of FIG. 9.

Referring to FIGS. 6 and 9, the bent part 130b of the bus bar frame 130 according to the present embodiment is located above the second portion 300a2 of the bottom part 300a of the U-shaped frame. At this time, it is preferable that the total thickness of the thickness of the bent part 130b and the thickness of the second portion 300a2 is smaller than the thickness of the first portion 300a1. This is because the protrusion part 110p of the battery cell 110 is caught by a step between the second portion 300a2 and the first portion 300a1, and the battery cell 110 may thus be prevented from moving due to external impact. In addition, a gap between the battery cell 110 and the U-shaped frame may be reduced through the processing of the bottom part 300a of the U-shaped frame, and this gap reduction effect may cause synergy with a gap reduction effect that may be obtained through height-direction assembling, thereby maximizing the overall space efficiency. In the processing of the bottom part 300a of the U-shaped frame, a step of the bottom part 300a may be formed simultaneously while the structure of the U-shaped frame is formed. Press forming, numerical control work (NC) processing, or the like may be used in order to form such a step.

The pad part 320 is located between the first portion 300a1 of the bottom part 300a and the battery cell 110, and the thermally conductive resin layer 310 is located inside the pad part 320. That is, the pad part 320 may be located between the thermally conductive resin layer 310 and the second portion 300a2 of the bottom part 300a to define a position where the thermally conductive resin layer 310 is formed.

Referring to FIG. 10, as compared with the embodiment of FIG. 9, the thickness of a bottom part 300a' of the module frame is uniform. When a battery cell 110' having the same size as the battery cell 110 described in FIG. 9 and a protrusion part 110p' are mounted on the bottom part 300a' of the module frame, the heights of the thermally conductive resin layer 310' and the pad part 320' may increase as there is no step as in the bottom part 300a of FIG. 9. Thus, as compared to the comparative example of FIG. 10, by reducing a tolerance between the battery cell 110 and the frame, as in the embodiment of FIG. 9, the space utilization may be improved, and by reducing the thickness of the thermally conductive resin layer 310, also as in the embodiment of FIG. 9, the amount of the thermally conductive resin used to form the thermally conductive resin layer 310 may be reduced.

In addition, in the case of the comparative example of FIG. 10, since the pad part 320' is attached onto the bent part 130b' of the bus bar frame, when the bus bar frame is formed, a thin injection material should be formed longer than that of the embodiment of FIG. 9. Thus, when the bus bar frame is formed, the formability may deteriorate.

Meanwhile, one or more battery modules according to an exemplary embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

110p: protrusion part
130a: main frame
130b: bent part
150: end plate
160: compression pad
300: U-shaped frame
310: thermally conductive resin layer
320: pad part
400: upper plate

The invention claimed is:
1. A battery module comprising:
a battery cell stack in which a plurality of battery cells are stacked;
a module frame accommodating the battery cell stack therein and having open upper part; and
an upper plate covering the battery cell stack over the open upper part of the module frame,
wherein the module frame includes a bottom part and two side parts positioned opposite to one other across the bottom part by a predetermined distance, and
wherein the bottom part includes a first portion and a second portion, wherein the first portion is located along a first edge of the bottom part extending along at least one of the side parts,
wherein the second portion has a reduced thickness portion,
wherein terminal ends of the reduced thickness portion are spaced away from respective planes of each of the two side parts, so as to be spaced away from the first portion, the respective planes extending parallel to an outer surface of each the two side parts,
wherein the reduced thickness portion is thinner than a thickness of the first portion and extends continuously across a majority of the predetermined distance.

2. The battery module according to claim 1, further comprising:
a pad part located between the bottom part and the battery cell stack,
wherein the pad part is in close contact with a connecting part connecting one of the side surface parts and to the bottom part at the first portion.

3. The battery module according to claim 2, wherein
the second portion of the bottom part includes a second portion extending along a second edge of the bottom part extending orthogonally to the first edge, and
the thickness of bottom part of the module frame is smaller in the second portion of the second portion than in the first portion.

4. The battery module according to claim 3, further comprising:
a bus bar frame connected to the battery cell stack, wherein
the module frame is open along two sides opposite to each other in a direction in which an electrode lead of the battery cell stack protrudes, and the bus bar frame is connected to the battery cell stack along each of the open sides of the module frame,
the bus bar frame includes a main frame disposed perpendicular to the direction in which the electrode lead protrudes, and a bent part extending from a lower portion of the main frame, and
the bent part is positioned above the second portion of the bottom part.

5. The battery module according to claim 4, wherein
a total thickness of the bent part and the bottom part of the module frame in the second portion is smaller than the thickness of bottom part of the module frame in the first portion.

6. The battery module according to claim 5, wherein
at least one of the plurality of battery cells includes a protrusion part protruding along a width direction of the battery cells, and the protrusion part is positioned on the bent part.

7. The battery module according to claim 2, wherein
the pad part is located between the battery cell stack and the bottom part of the module frame in the first portion.

8. The battery module according to claim 7, further comprising:
a thermally conductive resin layer located between the battery cell stack and the bottom part of the module frame in the first portion, wherein the pad part is located between the thermally conductive resin layer and the second portion of the module frame.

9. The battery module according to claim 1, wherein the module frame is open along two sides opposite to each other in a direction in which an electrode lead of the battery cell stack protrudes, the battery module further comprising:

end plates covering each of the open sides of the module frame.

10. A battery pack comprising the battery module according to claim 1.

11. The battery module according to claim 1, wherein the reduced thickness portion has a continuous thickness.

12. The battery module according to claim 8, wherein the pad part extends along the predetermined distance.

\* \* \* \* \*